United States Patent Office 2,751,302
Patented June 19, 1956

2,751,302

METHOD OF ACTIVATING THE NUTRIENT CONSTITUENTS OF DEHYDRATED LEAFY VEGETATION

William R. Graham, Jr., Wilmette, Ill., George O. Kohler, Mission, Kans., and Charles G. Blauw, Siloam Springs, Ark., assignors, by direct and mesne assignments, to The Quaker Oats Company, Chicago, Ill., a corporation of Maryland No Drawing. Application February 15, 1951,
Serial No. 211,182

9 Claims. (Cl. 99—2)

The present invention relates to improvements in methods for liberating and activating nutrient constituents of fresh and dried leafy green material thus improving the feeding value of those products.

This application is a continuation-in-part of Serial No. 695,800 filed September 9, 1946, which in turn is a continuation-in-part of previous applications, Serial No. 496,584 filed July 29, 1943, Serial No. 548,508 filed August 7, 1944, and Serial No. 606,720, filed July 23, 1945.

An important object of the invention is to provide feed stuffs from leafy green material which will possess unique nutritional characteristics and products that have new and valuable uses in the feeding of livestock and poultry.

Another object of our invention is to improve the natural state of nutrient substances present in green leafy forage crops, either as bound, conjugate, or other forms which are with difficulty utilized particularly by the nonherbivorous animals.

Another object of the invention is to simply the methods by which essential food factors of dehydrated leafy material may be activated.

Another object is to produce more complete activation of the food essentials or nutritional factors which are present, but are bound into the materials and rendered difficult to utilize or are incompletely active in the leafy material.

We have discovered that a nutrient quality in leafy green material may be made available to animals and birds by subjecting this type of material to oxidative processes and, surprising as it may seem, these oxidative processes improve the feeding value of fresh or unheated leafy green materials. It appears that oxidation of these materials releases or forms a substance or substances which improve growth in poultry or other livestock fed practical type rations. It is also possible that oxidation may destroy certain growth inhibiting substances present in alfalfa and other leafy material.

Methods commonly used for drying leafy green material apparently destroy certain nutrient factors of the product resulting in a deterioration of its feeding value. In other words the feeding value of dried leafy material is less and usually much less than that of the fresh material from which the dried product is obtained. We have now discovered that although a portion of the nutrient factors of leafy green material are inactivated by the process of dehydration these factors can be partially reactivated or liberated by the methods hereinafter to be described.

The essential novelty underlying the instant discoveries resides in the fact that the expressed juice of fresh leafy material is different from the product which is obtained by water extraction of dried leafy material. As suggested, the process of dehydration binds certain of the essential nutrients to the water insoluble parent material. These nutrients are easily water soluble in the fresh material and are pressed out or expressed with the juice. They become, however, with difficulty, water soluble or bound during dehydration of the leafy green material. The treatment of dehydrated green forage by processes hereinafter described produce new compositions of matter which may be more universally applied and constitute an improvement in feeding practices.

It has been discovered that certain nutrient fractions of the water extract of dehydrated material have undergone destructive oxidation in the process of dehydration and are reversibly reducible and oxidizable. The nutritional value of these fractions may be reactivated by the use of reducing agents and the nutritional entities apparently destroyed by dehydration are partially reactivated by the use of reducing agents.

The cleavage or activation of the bound group of factors that remain in the residue of dehydrated material after water extraction takes place readily when the material is autoclaved at 15 pounds pressure. One factor is released when the material is autoclaved while maintaining it at pH 4, while a second factor is activated when the material is autoclaved in an alkaline medium of approximately pH 9. It has been found that both of these nutrient essentials may be activated to a large degree in a single procedure wherein hot water treatment is employed, preferably autoclaved while the pH of the mixture of dried leaves and water is approximately 7 or near the neutral point.

The cleavage and reactivation of one or more of these nutrient essentials takes place rapidly or effectively at room temperature when an oxidizing agent is added to the slurry of dried leafy material and water. The instant invention recognize the apparent and insurmountable difficulties which confront the producer of dehydrated leafy green forage material who wishes to obtain full nutritional value of these forages in his finished product. The full value of a dehydrated product may only be expressed after reduction of one of the component parts and oxidation or hydrolytic cleavage of the other component. Water insoluble residue from dehydrated material after water treatment and extraction, contains materials of high biological value which may be reactivated by hot water treatment. The control of the degree of acidity and alkalinity is an important factor in reactivation of the active materials from the residue.

It has also been discovered that the fraction of dried leafy green material improved by reduction procedures may be readily separated from the fraction improved by hydrolytic cleavage or oxidation. The division or separation of these two fractions is accompanied by dissolving the reversibly oxidizable fraction in water at room temperature or not higher than 80° C. This fraction which is improved by reduction is easily soluble in an aqueous medium, whereas those which require cleavage or oxidation are more difficultly soluble. A rapid water extraction dissolves the nutrient which will be improved by reduction processes and leaves the materials which are improved by oxidation and cleavage in the undissolved residue. A reducing agent may be added to the water solution in this procedure or may be added to the water solution after the water soluble material is extracted. The residue after extraction may be activated by prolonged hot water treatment (80° to 100° C.) or autoclaving (15 pounds per square inch) for short periods.

The feeding value of the residue after water extraction may be improved by further water treatment or oxidation, or by a combination of the two. It is preferred to carry out these steps at elevated temperatures or elevated temperatures and pressures. Separation and extraction of water soluble factors which are dissolved with difficulty are more easily extractible if the temperatures are increased above 100° C. The active materials may be extracted from the residue after processing by water extraction, or they may be redried on the neutralized or oxidized residue.

It is well known that fish meal and fish press water are good sources of the so-called animal protein factor. We have found that oxidized grass juice, oxidized alfalfa juice or oxidized clover juice may take the place of certain properties possessed by fish press water and fish meal in the diet of growing animals and birds.

We have also ascertained that the oxidized juices stimulate the growth of chicks fed rations containing adequate amounts of animal protein factor sources such as fish meal, meat meal or condensed fish solubles. Furthermore, we have found that the enhanced qualities of these juices may be preserved through subsequent drying processes; thus, dilute, condensed and dried products of high nutrient value may be made from oxidized juices of green forage crops.

In addition to the fact that oxidation enhances the value of juices whether in the liquid or solid state we have found that the whole plant material may be made to possess similarly enhanced nutritional qualities through oxidation procedures. Thus, one may subject the whole or comminuted leafy material to an oxidative procedure which will enhance and improve its nutrient properties; then the material so oxidized may be dried by conventional methods and still maintain its increased nutrient potency.

The benefits of oxidation on the nutrient value of leafy green forage crops may be derived by subjecting these materials to oxidative procedures at any stage in the processing, from the whole fresh plant to the final finished concentrated product, which may be in the form of either expressed juice, residue after juice expression or complete dried plant material.

It is contemplated that the point in processing at which oxidation of the material is carried out will vary depending on the ease with which oxidation can be applied to the particular processing of the material undergoing treatment. While we prefer to produce products at natural to alkaline pH, the oxidative procedures may be applied either in the acid or alkaline ranges of pH. Various methods or means of oxidation may be used in enhancing the value of the leafy green material, some of which are described in the examples and explanation which follows.

The description of the process by which the feeding value of leafy green material is improved by oxidative processes serve to emphasize the fact that the oxidation step may be applied at any stage in the process. Many variations of the treatment are possible and it is not intended that our invention be limited strictly within the scope of the process explained and the examples given.

To begin with, the invention may be practiced by the oxidation of the juice expressed from freshly harvested material including fresh grass, clover, alfalfa, cereal grasses or the like, which are cut from fields in the conventional manner and transported to the processing plant where the material is chopped, macerated or ground. This finely divided leafy material is then pressed in a normal manner, pressure being applied to separate the juice from the fibrous residue. The juice is concentrated in conventional apparatus such as by vacuum evaporation, and after concentration, an oxidizing agent such as hydrogen peroxide, potassium permanganate or copper sulphate in predetermined amounts is added. The product formed may be packaged in the presence of appropriate preservatives and stored until such time as it is fed or it may be dried in a conventional apparatus such as roller drier, spray drier or the like and stored in a dried condition until such time as it is fed.

The benefits of our invention may alternately be obtained by oxidative treatment of the water soluble fraction of fresh leafy material obtained by removing the heat or acid coagulable fraction of the juice and concentrating the resultant clear brown solution. By this practice the beneficial results of oxidation on water soluble chick growth factors is obtained while the well known destructive effect of oxidation on the fat soluble vitamins is avoided, the fat soluble vitamins being precipitated with the protein fraction in such procedures.

The residue remaining from the fresh green material after the juice has been extracted may similarly be treated with an oxidizing agent if it is so desired to improve its potency of the nutrients that are the subject of this invention. In practice, we usually treat the residue with hydrogen peroxide, potassium permanganate or copper sulphate by mixing a solution of these oxidizing agents thoroughly with the slightly moistened press residue. The residue mixture containing the oxidizing material is then dried in any conventional manner and is stored until it is required for feeding. This procedure will destroy fat soluble vitamins in the product.

The oxidizing agent likewise may be added to the original green material as it comes from the field before it is ground or pressed and material so treated shows improvement in its nutrient values.

Our invention may similarly be practiced in the processing of whole forage crops such as grass, alfalfa or clover, harvested in the field and transported directly to the dehydrating plant. The leafy green material on arrival at the processing plant is chopped, macerated and/or ground in the presence of an oxidizing agent such as hydrogen peroxide, potassium permanganate or copper sulphate. We prefer to add a solution of the oxidizing agent to the leafy green material as it enters the machine for chopping, macerating and grinding since in this fashion a more thorough mixture of the agent and material is obtained. The mixture is then dried in any conventional manner and stored until it is fed.

Furthermore, the invention may also be practiced by the oxidation of leafy green forage crops which have been previously dried. To oxidize dehydrated forage crops the dried material is wet with approximately an equal weight of water to which has been added an oxidizing agent such as hydrogen peroxide, potassium permanganate or copper sulphate and after the dried material is thoroughly mixed with the oxidizing solution it is allowed to remain in contact with the dried crop for approximately one-half hour. At the end of this time the mixture is again dried and the dried product stored until such time as it is fed. It is also contemplated that the method may be varied, depending upon the desired end product. Fractionation is not required, but may be desirable to produce a product in which a single class of compounds, whether this class be that which is improved by reduction, or the class which is improved by hydrolysis, or that which is improved by oxidation. Likewise, it is contemplated that the water soluble fraction improved by reduction may be extracted, reduced and recombined with the residue after the latter has been treated separately by oxidation and hydrolytic methods. The recombined fractions may be dried and fed as such. In the examples which follow typical procedures are described.

EXAMPLE I

A 50 pound lot of dehydrated grass was extracted with cold water. The extract was concentrated in a stainless steel vacuum evaporator. The concentrated cold water extract was divided into seven equal parts.

A. One of these parts was held in a refrigerator with no further treatment.

B. A second portion was heated to 80° C. at natural pH and thereafter stored in the refrigerator until fed.

C. The pH of a third portion was adjusted to 4 and the material was warmed to 80° C. and held for two hours. The pH was then adjusted to 6 and the material stored in the refrigerator until fed.

D. The fourth portion was similarly treated, except that the material was treated at pH 9.

E. The fifth portion was treated with 25 ml. of superoxol (30% $H_2O_2$). This portion was allowed to stand for two hours at room temperature and then stored in a refrigerator until fed.

F. The sixth portion was treated with 26 grams of $NaHSO_3$ (sodium bisulfite). This portion was allowed to stand two hours at room temperature and was then stored in a refrigerator until fed.

G. Oxygen gas was bubbled through the seventh portion for a period of two hours after which it was stored in a cooler until feeding.

These materials were mixed with a basal synthetic ration and fed separately to seven groups of chickens. The chickens were weighed at weekly intervals and the growth of these birds was taken as a measure of the activity of the factors or preparations. The results of this experiment as measured in the growth of chicks is shown in Table I, and indicate that a water soluble material was definitely improved by treatment with a reducing agent. The table shows the effect of various treatments on the biological potency of cold water extract (C. W. E.) of dehydrated leafy green material when fed to chicks as a supplement to their diet.

*Table I*

| Treatment of C. W. E. | Weight in Grams at 5 Weeks of Age |
| --- | --- |
| Control | 254 |
| A. No treatment | 425 |
| B. 80° natural pH | 368 |
| C. 80° pH 4 | 445 |
| D. 80° pH 9 | 369 |
| E. $H_2O_2$ | 406 |
| F. $NaHSO_3$ | 470 |
| G. Oxygenation | 414 |
| H. C. W. E. of dry heated grass | 360 |

It is apparent from the above table that the nutrient entities involved are damaged by heat, alkalinity and oxidation. The results obtained with preparation "C" indicate that acid treatment is of some value. From other tests it is indicated that stannous chloride has a beneficial effect similar to $NaHSO_3$.

EXAMPLE II

In a second procedure, 20 pounds of dehydrated grass were divided into two 10 pound lots.

A. The first 10 pound lot was mixed with 35 pounds of cold water containing 45 grams of sodium bisulfite. The mixture was transferred immediately to a centrifuge and extracted with cold water by displacement. 40 pounds of extract were collected and this extract was concentrated in vacuo to approximately 35% solids and stored in a refrigerator until feeding.

B. The residue after cold water extraction was neutralized to pH 7 and autoclaved at 15 pounds' pressure for two hours. The material extracted after autoclaving the extract was concentrated in vacuo and held in a refrigerator until feeding.

C. The second 10 pound lot of grass was held in the refrigerator without treatment until feeding.

These preparations were mixed in a ration composed of natural feeding materials and fed to chickens. The weight of the chicks after five weeks of feeding is taken as a criterion of the value of the procedure. The results of these experiments are shown in Table II where each fraction is compared with:

C. The basal ration plus whole grass.
D. The basal ration plus synthetic folic acid.
E. The basal ration plus vacuum dried liver.

The results definitely demonstrate the activation of the poorly soluble fraction of the dehydrated grass by autoclaving at neutrality.

*Table II*

| Type of Material | Weight in Grams at 5 Weeks of Age |
| --- | --- |
| Control | 354 |
| A. Cold water extract | 353 |
| B. pH 7 extract | 422 |
| C. Whole grass | 375 |
| D. Folic acid | 354 |
| E. Vacuum dried liver | 395 |

EXAMPLE III

By a third procedure constituting a plurality of different steps indicated below, 140 pounds of dehydrated grass were extracted with a cold solution of sodium bisulfite and water as in Example II. The residue after extraction was neutralized to pH 7 and divided into six equal parts. The treatments described below were applied to the six different portions of material:

A. The first lot was autoclaved with 630 grams of ferric chloride in a total of 60 pounds of water. The pH was adjusted to 7.0 using NaOH solution. The autoclaving was conducted for one-half hour at 15 pounds pressure after thorough mixing. It was then extracted by displacement with water and the extract concentrated in vacuo and stored for feeding.

B. The second lot of residue was treated similarly except that 90 grams of potassium permanganate were used in place of the ferric chloride and the solution was not autoclaved, but was held at 90° C. for one-half hour.

C. The third lot was similar to the second lot in all regards except that the material was held at room temperature for one-half hour.

D. The fourth lot was treated as the second with 90 grams of potassium permanganate in a total of 60 pounds of water. The pH was adjusted to 7.0 and the mixture was autoclaved for one-half hour at 15 pounds pressure. The mass was redried without extraction.

E. Water was added to the fifth lot to bring the total water content to 60 pounds. The pH was adjusted to 7.0 and the mixture was autoclaved for one-half hour. It was then extracted and the extract concentrated and stored as above.

F. The sixth lot was treated with 90 grams potassium permanganate and sodium hydroxide was added to bring the pH to 7.0. The mixture was autoclaved for one-half hour, extracted, and the extract concentrated in vacuo and stored for feeding.

The various fractions were fed separately to chicks as an addition to a basal synthetic diet. The value of the procedures used may be judged from the weight of the chicks after five weeks feeding. The results of this program are shown in Table III following. This table not only demonstrates the value of the autoclaving and oxidation procedure, but also shows the beneficial effect which the oxidation action or cleavage has upon the biological value of leafy green material when fed to chicks as a supplement to a synthetic ration.

*Table III*

| Type of Material | Weight in Grams at 5 Weeks of Age |
| --- | --- |
| Control | 414 |
| A. Autoclaved 1/2 Hour+$FeCl_3$ | 455 |
| B. 90° to 100° C. 1/2 hour+$KMnO_4$ | 457 |
| C. Room temperature 1/2 hour+$KMnO_4$ | 426 |
| D. Autoclaved+$KMnO_4$ redried on residue | 457 |
| E. Autoclaved 1/2 hour | 423 |
| F. Autoclaved 1/2 hour+$KMnO_4$ | 447 |

EXAMPLE IV

According to a fourth procedure, 160 pounds of dehydrated grass were divided into eight 20 pound batches.

A. The first batch was extracted by water displacement and 80 pounds of extract was collected. The extract was discarded and water was added to the residue to bring the total content to 60 pounds. The pH was adjusted to 7.0 using sodium hydroxide solution and the mixture was autoclaved for two hours at 15 pounds pressure. It was then extracted with water and the extract concentrated in vacuo and stored for feeding.

B. The second batch was similarly treated except that it was exhaustively extracted with water in the primary cold water extraction.

C. The third lot was treated like the first except that it was autoclaved for one-half hour.

D. The fourth lot and the remaining lots received a primary extraction with cold sulfited water (1% sodium sulfite based on original grass weight). The residue from the fourth lot was then neutralized to pH 7, treated with 1% potassium permanganate (based on the original grass weight), autoclaved at 15 pounds pressure for one-half hour, reextracted with water and the water extract concentrated in vacuo, then stored for feeding.

E. The fifth lot was similarly treated except that it was held at 90° C. and was not autoclaved.

F. The sixth lot was similarly treated except that it was held at room temperature and was not autoclaved.

These preparations were mixed in a basal ration composed of natural feeding materials and fed to day old chicks. The results as measured by the weight of the chicks at five weeks are shown in Table IV. This table not only definitely demonstrates the value of both autoclaving and oxidizing, but shows the beneficial effects which the oxidative action or cleavage has on the biological value of leafy green material when fed to chicks as a supplement to a natural ration.

*Table IV*

| Type of Material | Weight in Grams at 5 Weeks of Age |
|---|---|
| Control | 323 |
| A. Preliminary water extraction; residue autoclaved 2 hours at pH 7, then extracted. pH 7 extract fed | 361 |
| B. Preliminary exhaustive water extraction; residue autoclaved 2 hours at pH 7, then extracted. pH 7 extract fed | 355 |
| C. Preliminary water extraction; residue autoclaved 1/2 hour at pH 7, then extracted. pH 7 extract fed | 369 |
| D. Preliminary extraction with sulfite solution; residue autoclaved 1/2 hours with $KMnO_4$ solution at pH 7, then extracted. pH 7 extract fed | 350 |
| E. Preliminary extraction with sulfite solution; residue held 1/2 hour at temperatures 90°C–100°C in $KMnO_4$ solution at pH 7, then extracted. pH 7 extract fed | 358 |
| F. Preliminary extraction with sulfite solution; residue held 1/2 hour at room temperature in $KMnO_4$ solution at pH 7, then extracted. pH 7 extract fed | 393 |

EXAMPLE V

One hundred pounds of rye leaves were chopped in a Smalley chopper, then disintegrated in a vertical hammermill and juiced by using a screw press. The pressed juice was concentrated in vacuo to a solids content of 16.34%. The material was then stored at about 15° F. until fed. Twenty pounds was thawed out for use in the present example and after thoroughly mixing the thawed juice concentrate, four 1000 gram aliquots were weighed out and treated as follows:

Lot 1.—Control lot—pH adjusted to 8.5 by adding concentrated $NH_4OH$ solution.

Lot 2.—pH adjusted to 8.5 with $NH_4OH$ solution as in Lot 1. Then add 1.5 ml. of 30% solution of $H_2O_2$.

Lot 3.—pH adjusted to 8.5 Then add 0.83 grams of $KMnO_4$ dissolved in 10 ml. of water.

Lot 4.—pH adjusted to 8.5 with $NH_4OH$ solution as in Lot 1. Then add 32.7 grams of a 20% solution of $CuSO_4 \cdot 5H_2O$ in water (equivalent to 6.54 gm. $CuSO_4 \cdot 5H_2O$).

These preparations were stored at 15° F. until used in the feeding experiment described below.

Day old white rock cockerels were fed a standard basal ration which contained no source of animal protein for eight days. At the end of this depletion period they were divided into six groups of equal growth rates, equal initial weights and having equalized variances of these functions. These equalized groups were then fed the same basal ration with supplements as shown in Table V.

*Table V*

| Group | Supplement | 5 Weeks weight (grams) |
|---|---|---|
| 1 | Negative Control—No juice | 299 |
| 2 | Untreated juice—Lot 1 [1] | 290 |
| 3 | $H_2O_2$ treated juice—Lot 2 [1] | 340 |
| 4 | $KMnO_4$ treated juice—Lot 3 [1] | 320 |
| 5 | $CuSO_4$ treated juice—Lot 4 [1] | 327 |
| 6 | Condensed Fish Solubles [1] | 332 |

[1] Fed at levels equivalent to 1 gm. of solids per 100 gm. basal ration.

The weights of the chicks fed these preparations are shown in Table V. The juice before oxidation demonstrated no supplementary value when added to the basal ration. The oxidized preparations showed an excellent response under this program of feeding as did the condensed fish solubles, a good source of "animal protein factor" (A. P. F.).

EXAMPLE VI

The following lots of freshly cut alfalfa were treated as described.

Prep. #1.—25 pounds of fresh alfalfa was disintegrated in a Rietz disintegrator and dried in a Proctor Schwartz tray drier at 100° C. for 1 hour. The dried product was ground in a hammermill and stored at 15° F. until used.

Prep. #2.—Same as Lot 1 except that 0.1 pound $CuSO_4.5H_2O$ vigorous stirring after disintegration and prior to drying.

Prep. #3.—305 pounds of fresh alfalfa was disintegrated in a Rietz disintegrator. The disintegrated mass was pressed in a horizontal type continuous screw press. The green juice thus obtained was heated to 80° C. At this temperature a green precipitate formed which contained the heat coagulable protein together with the chlorophyl and other lipoidal constituents as well as entrained cell debris. This green coagulum was separated from the brown supernatant liquid by centrifuging. 128 pounds of brown juice was obtained. Of this seven-eighths, or 112 pounds was concentrated in vacuo to obtain 8 pounds of brown concentrate containing 34% solids. This was designated Prep. #3. It was stored at 15° F. until it was used.

Prep. #4.—The remaining one-eighth of the dilute brown juice from Prep. #3 was treated with 0.1524 pound of $CuSO_4.5H_2O$ dissolved in a little water. This copper treated brown juice was then concentrated in vacuo to yield 3000 ml. of concentrate. This material was stored at 15° F. until used.

Prep. #5.—13 pounds of the screw press residue from Prep. #3 was dried in a Proctor Schwartz tray drier at 100° C. for 60 min. The dried material was ground in a hammermill and stored at 15° F. until used.

Prep. #6.—13 pounds of screw press residue from Prep. #3 was treated with 0.1524 pound of $CuSO_4.5H_2O$ dissolved in a little water. The residue was vigorously agitated during and subsequent to the addition of the copper sulfate solution. The mixture was then dried, ground and stored as described above.

The biological effects of the oxidative treatment (with $CuSO_4$ in this case), were measured as follows. Day old white rock cockerels were randomly separated into groups of 16 to 17 chicks. These groups were fed a practical type ration supplemented as shown for a five week period. The average weights of the groups at the end of the experiment are shown in the table below:

Table VI

| Supplement | Wt. at 5 weeks (grams) |
|---|---|
| 3% dried alfalfa—Prep. #1 | 289 |
| 3% $CuSO_4$ treated dried alfalfa—Prep. #2 | 338 |
| 3% conc. brown juice—Prep. #3 | 360 |
| 3% conc. $CuSO_4$ treated brown juice—Prep. #4 | 373 |
| 3% dried screw press cake—Prep. #5 | 355 |
| 3% dried $CuSO_4$ treated screw press cake—Prep. #6 | 376 |

The results shown in Table VI show that treatment of either whole alfalfa or of fractions thereof with an oxidizing agent, in this case copper sulphate, resulted in improved growth promoting properties. It is further demonstrated that drying does not negate the beneficial effect noted. That the copper ion is acting as an oxidizing agent is demonstrated by the fact that red cuprous oxide was observed to be present in the copper treated brown juice.

EXAMPLE VII 284 pounds of fresh rye leaves were disintegrated in a Rietz disintegrator. The pulpy mass obtained therefrom was pressed in a horizontal screw press to obtain the green press juice. This material was concentrated in vacuo to a solids content of 28.2%. Four lots of 3300 gm. each were weighed out and treated as follows:

Lot 1.—Add 32.1 gm. $Ca(OH)_2$. Stir thoroughly.
Lot 2.—Add 32.1 gm. Ca(OH) and 32.1 gm. $CuSO_4.5H_2O$.
Lot 3.—Add 47.7 gm. $CaCl_2$ and 32.1 gm. $Ca(OH)_2$.
Lot 4.—Add 47.7 gm. $CaCl_2$ and 32.1 gm. $Ca(OH)_2$ and 32.1 gm. $CuSO_4.5H_2O$.

These materials were fed as supplements to chicks receiving a ration similar to that used in Example #2, except that all groups received 3% fish meal.

The results are shown in the table below.

Table VII

| Supplement | Wt. at 5 weeks (grams) |
|---|---|
| 3% $Ca(OH)_2$ treated concentrate | 339 |
| 3% $Ca(OH)_2$ treated and $CuSO_4$ treated concentrate | 434 |
| 3% $Ca(OH)_2$+$CaCl_2$ treated concentrate | 353 |
| 3% $Ca(OH)_2$ treated+$CaCl_2$ treated+$CuSO_4$ treated concentrate | 429 |

It is clear that the oxidizing agent, in this case $CuSO_4.5H_2O$ markedly affected the nutritive value of the concentrate in a manner not matched by calcium hydroxide or calcium chloride. Calcium is an example of non-oxidizing bivalent metal.

EXAMPLE VIII 1700 pounds of fresh rye leaves were extracted with boiling water. The brown extract adjusted to pH 8.5 by adding concentrated NaOH was concentrated in vacuo to a solids content of about 50%. Seven 2100 gm. lots of the concentrated extract were treated as follows:

Lot 1.—Add 13.4 gm. $CuSO_4.5H_2O$ dissolved in a little water. Stir vigorously. This was equivalent to 1.5% of the dry weight of the concentrate.

Lot 2.—Add 26.8 gm. $CuSO_4.5H_2O$ as above (equivalent to 3% of the concentrate solids).

Lot 3.—Add 53.6 gm. $CuSO_4.5H_2O$ as above (equivalent to 6% of the concentrate solids).

Lot 4.—Add 4.46 gm. $KMnO_4$ as above (equivalent to 0.5% of the concentrate solids).

Lot 5.—Add 8.92 gm. $KMnO_4$ as above (equivalent to 1% of the concentrate solids).

Lot 6.—Add 17.84 gm. $KMnO_4$ as above (equivalent to 2% of the concentrate solids).

Lot 7.—Control—no treatment.

Day old white rock cockerels were fed a standard basal ration. Animal protein factor was supplied by including in the ration 0.5% of Lederle A. P. F. supplement. After nine days the chicks were segregated into groups of equal initial weights, equal growth rates and equal variances of these functions. Supplement feed and five week weight data are shown in the following table.

Table VIII

| Group | Supplement | Wt. at 5 Wks. (grams) |
|---|---|---|
| 1 | None—control | 299 |
| 2 | 1% untreated extract | 304 |
| 3 | 1% extract treated with equivalent to 1.5% $CuSO_4.5H_2O$ | 333 |
| 4 | 1% extract treated with equivalent to 3% $CuSO_4.5H_2O$ | 332 |
| 5 | 1% extract treated with equivalent to 6% $CuSO_4$ | 356 |
| 6 | 1% extract treated with equivalent to 0.05% $KMnO_4$ | 334 |
| 7 | 1% extract treated with equivalent to 1% $KMnO_4$ | 317 |
| 8 | 1% extract treated with equivalent to 2% $KMnO_4$ | 351 |

It is seen from this data that increasing amounts of oxidizing agents gave improved results. How much will be used in practice will be controlled by economic factors. At the present we prefer to use from 0.05 to 10% of oxidizing agent based on the solids content of the preparation being oxidized. Below 0.05% little or no growth effects are obtained. Above 10–15% the cost becomes too great.

We have thus clearly shown that nutritive value of forage crops and products obtained therefrom is greatly enhanced by treatment with oxidizing agents and have devised methods for the preparation of products having unique nutritional properties from vegetable materials. This development is of revolutionary nature since all authorities in the field of nutrition have in the past emphasized the need for avoiding the oxidation of reducing materials in foods and feeds, and have not realized that oxidation may be beneficial.

Having explained the methods for recovering the fractions and indicated in tabulated tests the results obtained upon experimental birds, it would appear that the procedures suggested have a definite effect in releasing nutrient constituents from dehydrated leafy vegetation, grass or forage crops. It will be obvious that the preferred conditions will vary with different types of material in order to produce optimum recovery. In some instances increased temperatures, oxidation and autoclaving will be desirable; in others, extraction is better performed at normal room temperatures without autoclaving and oxidation. In all events, the particular condition most advantageous may be readily determined by the simple tests disclosed and that particular procedure followed.

From the foregoing it will be seen that the invention is well adapted to attain all of the ends and objects hereinbefore set forth together with other advantages which are obvious and which are inherent to the methods suggested.

It will be understood that certain features and subcombinations are of utility and may be employed without reference to other features and subcombinations. This is contemplated by and is within the scope of the claims.

Furthermore, it is anticipated that one or more of the steps of the process may be interchanged or omitted without departing from the spirit of the invention.

As many possible embodiments may be made of the invention without departing from the scope thereof, it is to be understood that all matter herein set forth is to be interpreted as illustrative and not in a limiting sense.

Having thus described our invention, we claim:

1. A method of obtaining a feed of improved feeding value from leafy green vegetation comprising the step of reacting an oxidizing compound with said vegetation in the presence of moisture.

2. A method of obtaining a feed of improved feeding value from leafy green vegetation comprising the step of reacting an oxidizing compound of the class of copper sulphate and potassium permanganate with said vegetation in the presence of moisture.

3. A method of obtaining a feed of improved feeding value from leafy green vegetation comprising the steps of reacting an oxidizing compound with said vegetation in the presence of moisture and thereafter extracting juice therefrom to provide the feed.

4. A method of obtaining a feed of improved feeding value from leafy green vegetation comprising the steps of extracting juice from said vegetation, and reacting an oxidizing compound with the extracted juice.

5. A method as in claim 4 wherein said oxidizing compound is of the class of copper sulphate and potassium permanganate.

6. A method as in claim 4 wherein extraction is accomplished by expressing said juice from said vegetation.

7. A method as in claim 4 wherein extraction is accomplished by boiling said vegetation in water.

8. A method of improving the feeding value of juice extracted from leafy green vegetation comprising the step of reacting an oxidizing compound with said juice.

9. A method of improving the feeding value of juice extracted from leafy green vegetation comprising the step of reacting an oxidizing compound of the class of copper sulphate and potassium permanganate with said juice.

References Cited in the file of this patent

UNITED STATES PATENTS

| | | |
|---|---|---|
| 2,480,103 | Fux | Aug. 30, 1949 |
| 2,529,405 | Mettan | Nov. 7, 1950 |